(12) United States Patent
Dagani et al.

(10) Patent No.: US 12,008,675 B2
(45) Date of Patent: Jun. 11, 2024

(54) METHOD AND APPARATUS FOR ISOLATING 3D DRAW CALLS FOR SELECTIVE UPSCALING

(71) Applicant: Samsung Electronics Co., Ltd., Suwon-si (KR)

(72) Inventors: Gabriel T. Dagani, Austin, TX (US); Gregory Bergschneider, Frederick, CO (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/486,902

(22) Filed: Sep. 27, 2021

(65) Prior Publication Data

US 2022/0301096 A1 Sep. 22, 2022

Related U.S. Application Data

(60) Provisional application No. 63/163,026, filed on Mar. 18, 2021.

(51) Int. Cl.
| | |
|---|---|
| *G06T 1/20* | (2006.01) |
| *G06T 1/60* | (2006.01) |
| *G06T 11/20* | (2006.01) |
| *G06T 15/00* | (2011.01) |

(52) U.S. Cl.
CPC ............... *G06T 1/20* (2013.01); *G06T 1/60* (2013.01); *G06T 11/203* (2013.01); *G06T 15/005* (2013.01)

(58) Field of Classification Search
CPC . G06T 1/20; G06T 1/60; G06T 11/203; G06T 15/005
See application file for complete search history.

(56) References Cited

U.S. PATENT DOCUMENTS

| | | | | |
|---|---|---|---|---|
| 5,748,202 | A | * | 5/1998 | Nakatsuka ................ G06T 1/20 345/522 |
| 6,564,304 | B1 | * | 5/2003 | Van Hook ........... G06F 13/1626 710/39 |
| 8,947,432 | B2 | | 2/2015 | Bakdash et al. |
| 9,159,155 | B2 | | 10/2015 | Andersen |

(Continued)

FOREIGN PATENT DOCUMENTS

KR 100942783 B1 2/2010

*Primary Examiner* — Sing-Wai Wu
*Assistant Examiner* — Khoa Vu
(74) *Attorney, Agent, or Firm* — Renaissance IP Law Group LLP

(57) ABSTRACT

A system and a method are disclosed for separating 3D content from 2D UI content for selectively upscaling 3D draw calls. A controller, coupled to a graphics pipeline, determines whether an application supports upscaling and, if so, creates a full-resolution framebuffer for rendering 2D drawcalls bound to the graphics pipeline and a reduced-resolution framebuffer for rendering 3D drawcalls bound to the graphics pipeline. A drawcall is then determined to be a 2D or a 3D drawcall. The controller stores the drawcall in the full-resolution framebuffer if the draw call is a 2D drawcall and stores the drawcall in the reduced-resolution framebuffer if the draw call is a 3D drawcall. The draw stored in the reduced-resolution framebuffer is upscaled to be a full-resolution drawcall, and the 2D draw in the full-resolution framebuffer and the upscaled 3D draw are combined to form a final output.

16 Claims, 4 Drawing Sheets

(56) References Cited

U.S. PATENT DOCUMENTS

| | | | |
|---|---|---|---|
| 10,114,600 B2 | 10/2018 | Petrov | |
| 2014/0267259 A1* | 9/2014 | Frascati | G06T 15/005 |
| | | | 345/423 |
| 2015/0302546 A1* | 10/2015 | Balci | G06T 11/40 |
| | | | 345/522 |
| 2018/0253884 A1* | 9/2018 | Burnett, III | H04N 13/398 |
| 2018/0350036 A1* | 12/2018 | VanReenen | G06T 3/0093 |
| 2019/0355091 A1* | 11/2019 | Gierach | G06T 15/005 |
| 2020/0090384 A1 | 3/2020 | Atria et al. | |
| 2020/0380766 A1* | 12/2020 | Lentz | G06T 15/005 |
| 2021/0027752 A1 | 1/2021 | Holmes et al. | |

* cited by examiner

| Vertex Data | Shader | Timing | Texture | Depth Test |
|---|---|---|---|---|
| | Specific shaders may be detected as bound to the pipeline that are used for UI. These shaders may not use skinning, or high dynamic range coloring | | A B C D | A depth test is Typically disabled for a 2D UI during a draw |
| Two triangles are detected as a box, which may indicate a 2D UI overlay | | A 2D UI is typically rendered during the last render pass of a frame | Font Textures may be detected by indexing into a single texture in small equal box sizes | |
| 208a | 208b | 208c | 208d | 208e |

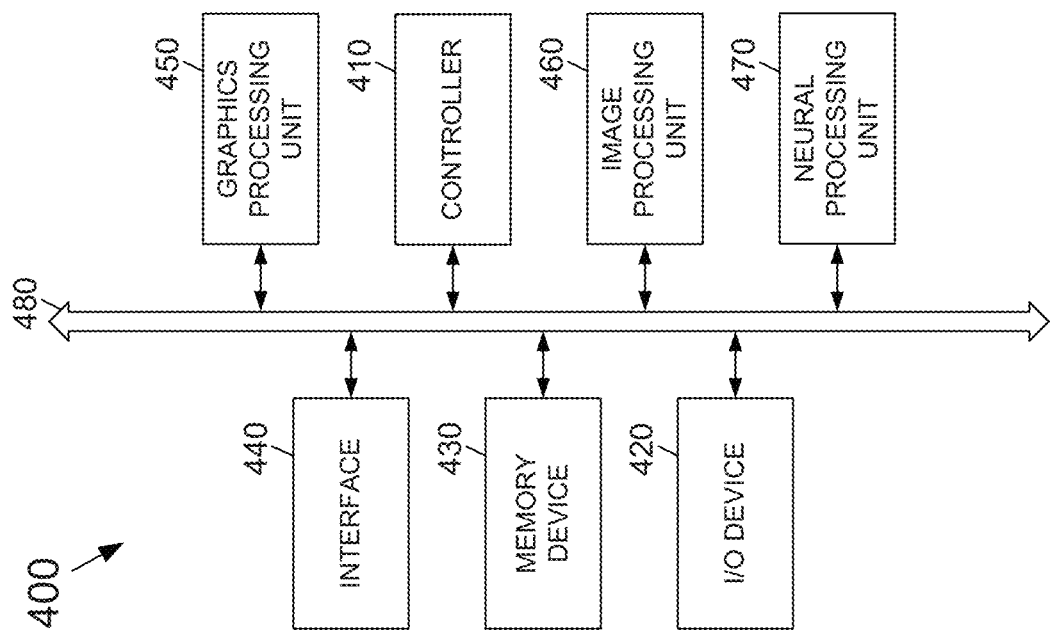

METHOD AND APPARATUS FOR ISOLATING 3D DRAW CALLS FOR SELECTIVE UPSCALING

CROSS-REFERENCE TO RELATED APPLICATION

This application claims the priority benefit under 35 U.S.C. § 119(e) of U.S. Provisional Application No. 63/163,026, filed on Mar. 18, 2021, the disclosure of which is incorporated herein by reference in its entirety.

TECHNICAL FIELD

The subject matter disclosed herein relates to graphic processing units (GPUs). More particularly, the subject matter disclosed here relates to a system and method for separating three-dimensional (3D) rendering content from two-dimensional (2D) User Interface (UI) content for selectively upscaling 3D draw calls.

BACKGROUND

A recent trend in 3D mobile graphics performance is to use neural networks (NNs) to upscale content from a GPU, which allows the GPU to render at a fraction (e.g., one-quarter) of the final resolution. A neural network model (or more traditional method such as bi-cubic interpolation) upscales a frame buffer of the GPU to a final desired output resolution, which improves the frame rate of the GPU by reducing the output resolution of frame buffer. This type of secondary upscaling process may be referred to herein as Rendered-Super-Resolution (RSR), and may be used for applications, such as camera upscaling, 3D-render frame upscaling, and the like.

This type of secondary upscaling process may not work well with rendered text or with line-based UI elements that include an overlaid 2D UI over 3D graphics. UI content rendered in 2D should be precise and crisp because its content is mostly static. Content rendered in 3D can typically absorb more flaws because of its inherent motion that hides flaws. Consequently, a developer (e.g., a game developer) may explicitly separate the UI (which may have 2D text and other elements) from the rest of the rendered frame during game creation in order to be able to use RSR on the 3D portion while rendering the 2D UI separately at full resolution. Established applications and games may, however, not benefit from this type of process.

SUMMARY

An example embodiment provides a method to render 2D content and 3D content of an application by a GPU in which the method may include: creating, by the GPU, a full-resolution frame buffer for rendering 2D draw calls and a reduced-resolution frame buffer for rendering 3D draw calls based on upscaling being supported; receiving, by the GPU, a draw call; storing, by the GPU, the draw call in the full-resolution frame buffer based on the draw call including a 2D draw call; storing, by the GPU, the draw call in the reduced-resolution frame buffer based on the draw call including a 3D draw call; upscaling, by the GPU, the draw call stored in the reduced-resolution frame buffer from a reduced-resolution to a full-resolution draw call; and combining, by the GPU, the 2D draw call in the full-resolution frame buffer and the 3D draw call upscaled to the full-resolution draw call to form a final output. In one embodiment, the method may further include determining by the GPU whether the draw call includes a 2D draw call or a 3D draw call based on a profile of the application. In another embodiment, the profile of the application may include at least one hint relating to isolating 2D UI content from 3D rendering content. In still another embodiment, the method may further include determining by the GPU whether the draw call includes a 2D draw call or a 3D draw call based on two triangles being detected as a box. In yet another embodiment, the method may further include determining by the GPU whether the draw call includes a 2D draw call or a 3D draw call based on detecting a shader that is bound to a pipeline of the GPU that will be used for a UI. In one embodiment, determining by the GPU whether the draw call may include a 2D draw call or a 3D draw call may be further based on detecting that the draw call does not use skinning or high-dynamic range coloring to render the draw. In another embodiment, the method may further include determining by the GPU whether the draw call may include a 2D draw call or a 3D draw call based on determining that the draw call is rendered during a last pass of a frame. In still another embodiment, the method may further include determining by the GPU whether the draw call may include a 2D draw call or a 3D draw call based on determining a single texture is indexed into small equal box sizes to indicate font retrieval. In one embodiment, the method may further include determining by the GPU whether the draw call may include a 2D draw call or a 3D draw call based on determining that at least one of a depth test for the draw call is disabled, a draw-call order and rendering quadrants of the draw call. In another embodiment, the method may further include accumulating by the GPU 2D UI draws with a specialized alpha component in the full-resolution frame buffer for combining with 3D renders in the reduced-resolution frame buffer.

An example embodiment provides a GPU that may include a graphics pipeline and a controller. The graphics pipeline may be configured to receive 2D and 3D content for rendering, and the controller may be coupled to the graphics pipeline. The controller may be configured to: determine whether an application supports upscaling, create a full-resolution frame buffer for rendering 2D draw calls bound to the graphics pipeline and a reduced-resolution frame buffer for rendering 3D draw calls bound to the graphics pipeline based on upscaling being supported, determine whether a draw call may include a 2D draw call or a 3D draw call, store the draw call in the full-resolution frame buffer based on the draw call including a 2D draw call, store the draw call in the reduced-resolution frame buffer based on the draw call including a 3D draw call, upscale the draw stored in the reduced-resolution frame buffer to be a full-resolution draw call, and combine the 2D draw call in the full-resolution frame buffer and the 3D draw upscaled to the full-resolution draw call to form a final output. In one embodiment, the controller may be further configured to determine the draw call includes a 2D draw call or a 3D draw call based on a profile of the application. In another embodiment, the profile of the application may include at least one hint relating to isolating 2D UI content from 3D rendering content. In still another embodiment, the controller may be further configured to determine whether the draw call comprises a 2D draw call or a 3D draw call based on two triangles being detected as a box. In yet another embodiment, the controller may be further configured to determine whether the draw call includes a 2D draw call or a 3D draw call based on detecting a shader that is bound to a pipeline of the GPU that will be used for a UI. In one embodiment, the controller may be further configured to determine whether the draw call includes a 2D draw call or a 3D draw call based on detecting that the draw call does not use skinning or high-dynamic range coloring to render the draw call. In another embodiment, the controller may be further configured to determine whether the draw call includes a 2D draw call or a 3D draw call based on the draw call being rendered during a last pass of a frame. In yet another embodiment, the controller may be further configured to determine whether the draw call includes a 2D draw call or a 3D draw call based on a single texture being indexed into small equal box sizes to indicate font retrieval. In one embodiment, the controller may be further configured to determine whether the draw call includes a 2D draw call or a 3D draw call based at least one of a depth test for the draw call being disabled, a draw-call order and rendering quadrants of the draw call. In another embodiment, the controller may be further configured to further accumulate 2D UI draws with a specialized alpha component in the full-resolution frame buffer for combining with 3D renders in the reduced-resolution frame buffer.

BRIEF DESCRIPTION OF THE DRAWING

In the following section, the aspects of the subject matter disclosed herein will be described with reference to exemplary embodiments illustrated in the figures, in which:

FIG. 3 depicts some example 2D detection methods that may be part of a 2D detection profile according to the subject matter disclosed herein; and FIG. 4 depicts an electronic device that includes a GPU that is capable of separating 3D rendering content from 2D UI content for selectively upscaling 3D draw calls according to the subject matter disclosed herein.

DETAILED DESCRIPTION

Figure 1:
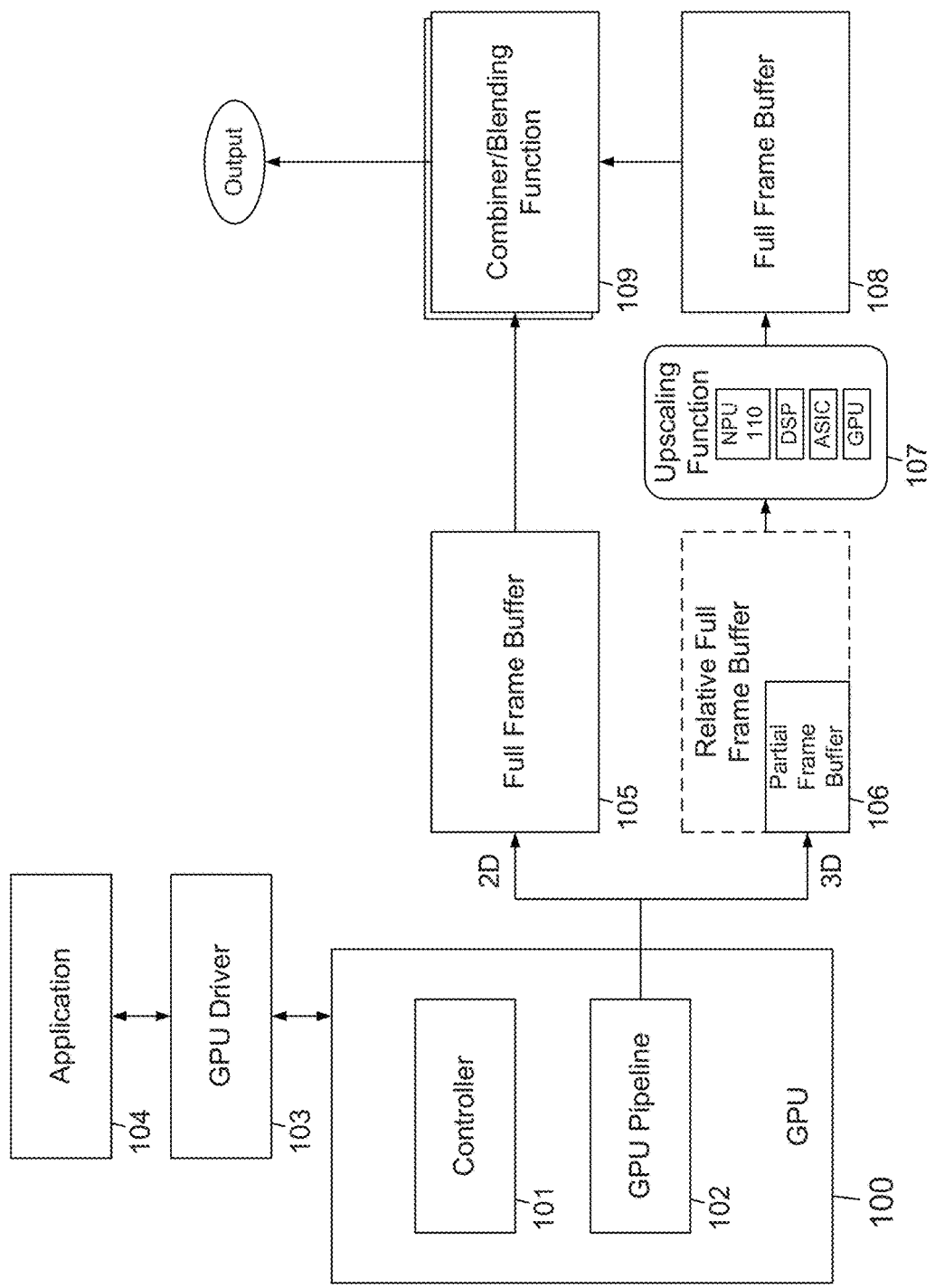
FIG. 1 is a functional block diagram of an example embodiment of a GPU that includes a capability for detecting and separating a 2D UI content from 3D render content according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system-on-a-chip (SoC), an assembly, and so forth.

The subject matter disclosed herein provides a technique for separating 2D user-interface draws from 3D-rendered draws so that an additional upscaling pass may be used on the 3D-rendered draws by either a GPU or a separate accelerator, such as a Neural Network Processing Unit (NPU). A full-resolution rendered frame may then be output in which the 3D portions are rendered at a reduced resolution, then upscaled and combined with a full resolution UI framebuffer. Some 3D applications may have different behaviors in response to a UI, so hints may be used that may be manually derived and updated to a database for lookup GPU driver at runtime to improve the likelihood of successful separation of 3D draw calls and 2D draw calls.

In one embodiment, the subject matter disclosed herein provides a GPU driver that may use an application profile to detect 2D UI content so that 3D rendering content may be separated, or isolated, from the 2D UI content. The GPU driver that may attach a full resolution framebuffer to accumulate 2D UI draws with a specialized alpha component for later combination with a 3D framebuffer. An alpha component is typically the $4^{th}$ channel in a 16- or 32-bit pixel represented by R-G-B-A (Red, Green, Blue, Alpha) in which each channel includes between 5-8 bits. In some special cases, like RGB10A2, the RGB channels are 10 bits and the alpha channel is only 2 bits. The alpha channel is typically used to describe a level of blending or transparency between itself and a resident layer of rendered content. However, in this use case the alpha channel may be repurposed to provide binary meta details to the driver indicating 2D or 3D content. The subject matter disclosed herein may thus allow older games that may not have 3D-engine features to take advantage of RSR without artifacts that may be generated by upscaled text rendering and other UI content that may suffer from upscaling. Additionally, 2D UI portions of an application frame that may be detected apart from 3D frames may be used to influence a frame buffer compression process (e.g., lossless vs. lossy).

In one embodiment, the subject matter disclosed herein provides a method of rendering by a GPU that may include determining that an upscaling algorithm feature is supported by an application; if an upscaling algorithm is supported, creating a full-resolution frame buffer into which 2D draw calls are rendered and a reduced-resolution frame buffer into which 3D draw calls are rendered; determining whether a received draw call is a 2D draw call or a 3D draw call; storing the draw call in the full-resolution frame buffer based on the received draw call being a 2D draw call; storing the received draw call in the reduced-resolution frame buffer based on the received draw call being a 3D draw call; upscaling the reduced-resolution frame buffer into full resolution; and combining both the upscaled 3D rendered draw call with the 2D full-resolution frame buffer for a final output. In one embodiment, an application profile may be used to provide hints for detecting 2D UI content so that the 2D UI content may be separated from 3D rendering content. Additionally or alternatively, graphical assets and/or shaders may be evaluated to detect and isolate 2D UI content from 3D rendering content. Further, draw call ordering and/or rendering quadrants may be used for detecting and separating 2D UI content from 3D rendering content. The 2D UI draws may be accumulated with a specialized alpha component in the full-resolution frame buffer for later combining with 3D renderings from the partial framebuffer.

When an application supports an RSR feature, a GPU and/or a SoC may create and/or bind a reduced-resolution frame buffer to a graphics pipeline for a 3D destination to have, for example, one-half, one-quarter, etc., of a larger resolution (e.g., original and/or full resolution). Additionally, a full-resolution frame buffer may also be created and/or bound to a graphics pipeline for the 2D output. The rendered 3D output of the GPU frame may then be sent to an NPU using a specialized NN model for upscaling to a higher (e.g., the fully intended) resolution. From the NPU, the upscaled frame buffer may then be sent to a Display Processing Unit (DPU). The 2D output of the full-resolution frame buffer may be sent from the GPU directly to the DPU, for example, for coalescing with the 3D framebuffer to create a final display. Alternatively, the 2D overlay may be drawn on top of the 3D framebuffer by using, for example, additive blending.

FIG. 1 is a functional block diagram of an example embodiment of a GPU 100 that includes a capability for detecting and separating a 2D UI content from 3D render content according to the subject matter disclosed herein. The GPU 100 may include a controller 101 and a graphics pipeline 102. The controller 101 may interface with and may be responsive to a GPU driver 103. An application 104 may interface with the GPU driver 103 for rendering on a display (not shown) coupled to the GPU. The graphics pipeline 102 may include functionality for detecting 2D and 3D draws as described herein. The graphics pipeline 102 may include, but is not limited to, one or more vertex shaders, hull shaders, geometry shaders, perspective transformers and/or pixel shaders, one or more clipping and culling stages, one or more rasterization stages, and one or more depth testing stages, all of which are not specifically shown as a pipeline configuration may be specific to a GPU embodiment. The graphics pipeline 102 may also include a full-resolution frame buffer 105 for a 2D UI and a reduced-resolution (partial-resolution) frame buffer 106. The reduced-resolution frame buffer 106 may be part of a relative full frame buffer. An upscaler 107, such as a Neural Processing Unit (NPU) with an upscaling kernel loaded 110, a Digital Signal Processor (DSP), an Application Specific Integrated Circuit (ASIC), or the GPU 100, may upscale the reduced-resolution frame buffer 106 to be a full frame buffer 108. The full frame buffer 105 (containing a 2D UI) may be combined, or blended, with the full frame buffer 108 (containing the 3D draw) in a final full-resolution frame buffer 109. The final frame buffer 109 may be sent to a display (not shown) or may be stored in a memory depending on the use case.

The various components and functional capabilities of the GPU 100 may be provided by one or more modules. Some embodiments of the GPU 100 may be implemented on a mobile application processor, but it should be understood that implementation is not so limited and may be implemented in other contexts, such as, a computer system that may make use of a subset of a central processing unit (CPU), GPU, NPU, and/or a DPU. Further, some embodiments may use a GPU 100 with a NN model to combine, or blend, the output of the application to full resolution. Alternatively, some embodiments may use a GPU to blend upscaled 3D content with a 2D UI overlay. Some other embodiments may use an NPU (110 in FIG. 1.) to blend upscaled 3D content with a 2D UI overlay.

Figure 2:
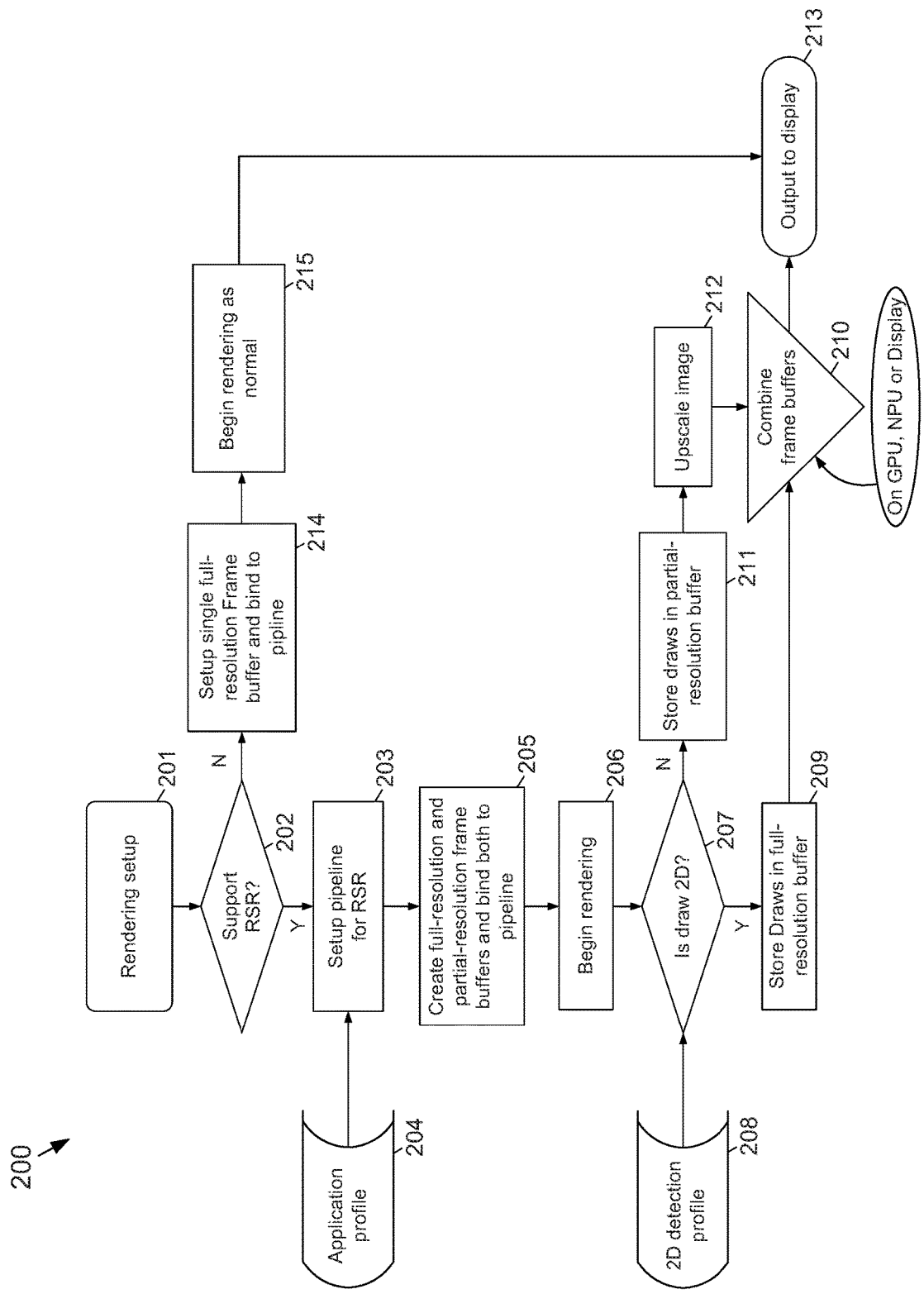
FIG. 2 is a flowchart of an example embodiment of a method for isolating a UI from 3D contexts for rendering (e.g., high-resolution rendering) according to the subject matter disclosed herein.

FIG. 2 is a flowchart of an example embodiment of a method 200 for isolating a UI from 3D contexts for rendering (e.g., high-resolution rendering) according to the subject matter disclosed herein. Referring to both FIGS. 1 and 2, the method 200 begins at 201 with the GPU driver 103 initiating a rendering set up in response to a draw call from the application 104. At 202, the GPU driver 103 determines whether the application 104 supports RSR. Alternatively, the GPU 100 may include functionality for determining whether the application 104 supports RSR. If the application supports RSR, flow continues to 203 where the controller 101 sets up, or configures, the pipeline 102 for RSR based on an application profile 204.

The application profile 204 may, for example, be generated prior to runtime by a GPU vendor, and may identify a partition of draw calls to separate 2D- and 3D-based draw calls. The partitioning may attach a meta label to some or all draw calls considered to be a UI for redirection into the separate larger (e.g., full-size) frame buffer 105. When a developer-supplied application profile is used, a primary rendering may be sent to the reduced-size frame buffer 106, while the 2D content of the UI may be sent to a separate larger (e.g., full-size) frame buffer 105. The separation of the two types of content may be accomplished by attaching both frame buffers to the graphics pipeline 102 and passing flags (not shown) to the graphics shaders of the graphics pipeline to alter the output render target while adjusting position variables to take the variable screen sizes into account. Alternatively, separate rendering of 2D UI content and 3D rendering may be accomplished by creating two separate pipelines and shunting specific draw calls and graphics descriptors into the corresponding pipeline based on the whether 2D or 3D content is being rendered.

For a given an application, one or more pre-arranged hints may be compiled into the application profile 204 to improve 2D UI isolation. The pre-arranged hints may be used as an enhancement if a particular detection method (described below) produces an insufficient result. In some embodiments, if a suitable 2D UI separation is not achieved for an application, and/or the result of not isolating the UI is insufficient, the application profile 204 may include a hint to partially or completely turn off RSR.

An application profile 204 for detecting a 2D UI for separation from a 3D rendering may include one or more of the following non-limiting list of detection aspects: one or more signatures of vertex data that may include a vertex count and/or position data; one or more signature of textures that are bound to draw call; one or more render pass signatures and/or pipeline signatures for a UI draw call; a depth state at the time of draw; a shader signature and/or uniform data that indicates a UI draw; and/or a position of a render pass in a command buffer that contains a UI draw in a frame.

Returning attention to FIGS. 1 and 2, flow continues from 203 to 205 where a full-resolution frame buffer 105 and a partial-resolution frame buffer 106 are created. Both the full-resolution and the partial-resolution frame buffers are bound to the pipeline 102. At 206, rendering begins. At 207, it is determined using a 2D detection profile 208 whether a draw call is a 2D draw call. In one example embodiment, a middleware engine may be used to provide a clean separation between scene art and construction from the graphics Application Programming Interface (API) calls that may drive the GPU. The separation of art/construction and the API may typically isolate the 3D content from 2D overlays in source-code space. This may be embodied in the API stream seen by the driver by separation of render passes, and a frequently rendered framebuffer.

FIG. 3 depicts some example 2D detection methods that may be part of a 2D detection profile 208 according to the subject matter disclosed herein. The detection profile items depicted in FIG. 3 are exemplary only and not a comprehensive list.

Item 208a in FIG. 3 relates to a change in draw parameter pattern may be used to identify a 2D UI overlay. For example, a post-processed graphics application may render main 3D geometry with apparently random draw parameters, followed by one or more draws containing four vertices that constitutes a triangle strip generated quad. The quad may be used to cover a portion of or an entire render target to apply a post-process operation per pixel. Because UIs may not be per-pixel operations, and/or they may not be processed through post-processing, they may follow the post-process passes and may contain more than a four vertices and, thereby, be detected as a 2D UI overlay.

Item 208b relates to detecting a 2D UI overlay by identifying specific shaders as being bound to the pipeline that are only used for UI rendering. These specific shaders may, for example, not use skinning or high dynamic range coloring. Draws that do not use high dynamic range (HDR) coloring may be detected as 2D UI content because UIs are flat texture maps.

Item 208c relates to detecting a 2D UI, despite a potential z-rejection benefit of being on top, as typically being rendered during a last render pass of a frame with the expectation that the UI should not cover many pixels, otherwise an interesting portion of the scene may be obscured by relatively uninteresting status indicators. Also, it is typically the last draw in a frame because it is always on top and will always overwrite competing pixels.

Item 208d relates to font textures that may be detected by indexing into a single texture in small equal sized boxes. A 2D UI overlay may be identified as a texture sample pattern in a GPU shader compiler of font textures that may be accessed in a specific sub-tiling pattern to index one or more characters of a font map.

Item 208e relates to disabled depth testing, which may be used to identify a 2D UI overlay because UIs are typically forced to be visible and offline dictated back to front order, so no depth testing is used during their rendering.

Returning attention to FIGS. 1 and 2, if at 207 it is determined that a draw call is a 2D draw, flow continues to 209 where the draw is stored in the full-resolution frame buffer 105. If, at 207, the draw is not a 2D draw, flow continues to 211 where the draw is stored in the reduced-resolution frame buffer 106. Flow continues to 212 where the image is upscaled by, for example, an upscaler 107 or a neural network. The draw stored in the full-resolution frame buffer at 209 and the upscaled image at 212 are combined at 210 by the GPU, a NPU 110 or at the display (if capable), and at 213 output for display or storage depending on the use case.

If, at 202, the application does not support RSR, flow continues to 214 where single full-resolution framebuffer is set up and bound to the pipeline 102. At 215, rendering begins and completes as normal. At 213, the normal rendering set up is output to the display at 213.

FIG. 4 depicts an electronic device 400 that includes a GPU that is capable of separating 3D rendering content from 2D UI content for selectively upscaling 3D draw calls according to the subject matter disclosed herein. The electronic device 400 may include a controller (or CPU) 410, an input/output device 420 such as, but not limited to, a keypad, a keyboard, a display, a touch-screen display, a camera, and/or an image sensor, a memory 430, an interface 440, a GPU 450, an imaging-processing unit 460, and a neural processing unit 470 that are coupled to each other through a bus 480. The controller 410 may include, for example, at least one microprocessor, at least one digital signal processor, at least one microcontroller, or the like. The memory 430 may be configured to store a command code to be used by the controller 410 or a user data.

Electronic device 400 and the various system components of electronic device 400 may include the image processing unit 460, which may include a GPU that is capable of separating 3D rendering content from 2D UI content for selectively upscaling 3D draw calls according to the subject matter disclosed herein. The GPU 450 may also be capable of separating 3D rendering content from 2D UI content for selectively upscaling 3D draw calls according to the subject matter disclosed herein. The interface 440 may be configured to include a wireless interface that is configured to transmit data to or receive data from a wireless communication network using a RF signal. The wireless interface 440 may include, for example, an antenna. The electronic system 400 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), Fifth-Generation Wireless (5G), Sixth-Generation Wireless (6G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method to render two-dimensional (2D) content and three-dimensional (3D) content of an application by a graphics processing unit (GPU), the method comprising:
creating, by the GPU, a full-resolution frame buffer for rendering 2D draw calls and a reduced-resolution frame buffer for rendering 3D draw calls based on upscaling being supported;
receiving, by the GPU, a draw call;

determining, by the GPU, that the draw call comprises both a 2D draw call and a 3D draw call based on determining rendering quadrants of the draw call, and, in response, separating the 2D draw call from the 3D draw call by:
  storing the 2D draw call in the full-resolution frame buffer, and
  storing the 3D draw call in the reduced-resolution frame buffer;
upscaling, by the GPU, the draw call stored in the reduced-resolution frame buffer from a reduced-resolution to a full-resolution draw call; and
combining, by the GPU, the 2D draw call in the full-resolution frame buffer and the 3D draw call upscaled to the full-resolution draw call to form a final output.

2. The method of claim 1, further comprising determining by the GPU that the draw call comprises a 2D draw call and a 3D draw call based on a profile of the application.

3. The method of claim 2, wherein the profile of the application includes at least one hint relating to isolating 2D User Interface (UI) content from 3D rendering content.

4. The method of claim 1, further comprising determining by the GPU that the draw call comprises a 2D draw call and a 3D draw call based on two triangles being detected as a box.

5. The method of claim 1, further comprising determining by the GPU that the draw call comprises a 2D draw call and a 3D draw call based on detecting a shader that is bound to a pipeline of the GPU that will be used for a User Interface (UI).

6. The method of claim 5, wherein determining by the GPU that the draw call comprises a 2D draw call and a 3D draw call is further based on detecting that the draw call does not use skinning or high-dynamic range coloring to render the draw.

7. The method of claim 1, further comprising determining by the GPU that the draw call comprises a 2D draw call and a 3D draw call based on determining that the draw call is rendered during a last pass of a frame.

8. The method of claim 1, further comprising accumulating by the GPU 2D UI draws with a specialized alpha component in the full-resolution frame buffer for combining with 3D renders in the reduced-resolution frame buffer.

9. A graphics processing unit (GPU), comprising:
  a graphics pipeline configured to receive two-dimensional (2D) and three-dimensional (3D) content for rendering; and
  a controller coupled to the graphics pipeline, the controller being configured to:
    determine whether an application supports upscaling,
    create a full-resolution frame buffer for rendering 2D draw calls bound to the graphics pipeline and a reduced-resolution frame buffer for rendering 3D draw calls bound to the graphics pipeline based on upscaling being supported,
    determine that a draw call comprises a 2D draw call and a 3D draw call based on determining that a single texture is indexed into small equal box sizes to indicate font retrieval,
    separate the 2D draw call from the 3D draw call by:
      storing the 2D draw call in the full-resolution frame buffer,
      storing the 3D draw call in the reduced-resolution frame buffer,
    upscale the draw call stored in the reduced-resolution frame buffer to be a full-resolution draw call, and
    combine the 2D draw call in the full-resolution frame buffer and the 3D draw upscaled to the full-resolution draw call to form a final output.

10. The GPU of claim 9, wherein the controller is further configured to determine that the draw call comprises a 2D draw call and a 3D draw call based on a profile of the application.

11. The GPU of claim 10, wherein the profile of the application includes at least one hint relating to isolating 2D User Interface (UI) content from 3D rendering content.

12. The GPU of claim 9, wherein the controller is further configured to determine that the draw call comprises a 2D draw call and a 3D draw call based on two triangles being detected as a box.

13. The GPU of claim 9, wherein the controller is further configured to determine that the draw call comprises a 2D draw call and a 3D draw call based on detecting a shader that is bound to a pipeline of the GPU that will be used for a User Interface (UI).

14. The GPU of claim 13, wherein the controller is further configured to determine that the draw call comprises a 2D draw call and a 3D draw call based on detecting that the draw call does not use skinning or high-dynamic range coloring to render the draw call.

15. The GPU of claim 9, wherein the controller is further configured to determine that the draw call comprises a 2D draw call and a 3D draw call based on the draw call being rendered during a last pass of a frame.

16. The GPU of claim 9, wherein the controller is further configured to further accumulate 2D UI draws with a specialized alpha component in the full-resolution frame buffer for combining with 3D renders in the reduced-resolution frame buffer.

* * * * *